United States Patent
Lim et al.

(10) Patent No.: US 10,996,315 B2
(45) Date of Patent: May 4, 2021

(54) RADAR APPARATUS FOR VEHICLE AND METHOD FOR ESTIMATING ANGLE USING SAME

(71) Applicant: MANDO CORPORATION, Gyeonggi-do (KR)

(72) Inventors: Hae Sueng Lim, Gyeonggi-do (KR); Seong Hee Jeong, Gyeonggi-do (KR); Jae Eun Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 194 days.

(21) Appl. No.: 16/131,696

(22) Filed: Sep. 14, 2018

(65) Prior Publication Data
US 2019/0079164 A1     Mar. 14, 2019

(30) Foreign Application Priority Data
Sep. 14, 2017   (KR) .................. 10-2017-0117955

(51) Int. Cl.
  *G01S 7/40* (2006.01)
  *G01S 13/931* (2020.01)

(52) U.S. Cl.
  CPC .............. *G01S 7/4026* (2013.01); *G01S 7/40* (2013.01); *G01S 13/931* (2013.01); *G01S 2007/403* (2013.01); *G01S 2007/4034* (2013.01)

(58) Field of Classification Search
  CPC ........ G01S 7/4026; G01S 7/40; G01S 13/931; G01S 2007/4034; G01S 2007/403
  USPC .......................................................... 342/173
  See application file for complete search history.

(56) References Cited

U.S. PATENT DOCUMENTS

| | | | | |
|---|---|---|---|---|
| 3,110,026 A * | 11/1963 | Barbour, Jr. | ............... | G01S 7/40 342/172 |
| 4,000,491 A * | 12/1976 | Bishop | ...................... | G01S 7/40 342/169 |
| 6,411,252 B1 * | 6/2002 | Grace | .................. | H01Q 1/3233 342/165 |
| 7,528,767 B2 * | 5/2009 | Walker | ..................... | G01S 7/025 342/174 |
| 9,322,864 B2 * | 4/2016 | Foegelle | ............... | G01R 29/105 |
| 2004/0017308 A1 * | 1/2004 | Kikuchi | ............... | H01Q 1/3233 342/74 |
| 2006/0109168 A1 * | 5/2006 | Nakanishi | ............. | G01S 13/426 342/70 |
| 2013/0088382 A1 * | 4/2013 | Lee | ........................ | G01S 7/4052 342/174 |
| 2016/0033632 A1 * | 2/2016 | Searcy | ................ | G01S 13/4454 342/153 |

* cited by examiner

*Primary Examiner* — Frank J McGue
(74) *Attorney, Agent, or Firm* — Ladas & Parry, LLP

(57) ABSTRACT

The present disclosure relates to a method in which a radar apparatus for a vehicle detects a mounting angle and the radar apparatus for a vehicle, and more particularly, to a method for detecting a mounting angle of a radar apparatus for a vehicle using a power ratio of signals acquired by transmitting signals having different directivity angles and the radar apparatus for a vehicle.

20 Claims, 8 Drawing Sheets

FIG.8

RADAR APPARATUS FOR VEHICLE AND METHOD FOR ESTIMATING ANGLE USING SAME

CROSS REFERENCE TO RELATED APPLICATION

This application claims priority from Korean Patent Application No. 10-2017-0117955, filed on Sep. 14, 2017, which is hereby incorporated by reference for all purposes as if fully set forth herein.

BACKGROUND OF THE INVENTION

1. Field of the Invention

The present disclosure relates to a radar apparatus for a vehicle and a method for estimating an angle of the radar apparatus for a vehicle.

2. Description of the Prior Art

Recently, as interest in safety and driver convenience has increased, a variety of vehicle safety and convenience technologies using a radar apparatus for a vehicle have been developed. For example, various technologies such as a smart cruise technology, an automatic driving technology, an automatic emergency stop technology, and the like have been developed to detect a forward vehicle and to automatically follow the detected forward vehicle.

The radar apparatus for a vehicle is a device for detecting the surroundings using a signal reflected by an object after transmitting a signal. In order to secure the performance of the radar apparatus for a vehicle, the radar apparatus for a vehicle must be mounted at an appropriate angle.

Accordingly, in a vehicle production process step, alignment of a radar sensor to be mounted on the vehicle with respect to the vertical direction and the horizontal direction is performed. The alignment of the radar apparatus is performed even when misalignment of the radar apparatus occurs due to contact or collision with an external object after the vehicle is shipped.

In order to align the radar apparatus, it is necessary to reliably measure the mounting angle of the radar apparatus, particularly, the mounting angle of the radar apparatus with respect to the traveling direction of the vehicle.

SUMMARY OF THE INVENTION

In the context of the above description, a radar apparatus and an angle detection method for detecting a mounting angle based on control and processing of a transmission/reception signal without a special mechanical configuration are proposed.

In accordance with an aspect of the present disclosure, there is provided a method for estimating an angle of a radar apparatus for a vehicle, the method including: receiving, by the radar apparatus mounted on a vehicle, a first test signal reflected by a test target after transmitting a signal at a first directivity angle; receiving a second test signal reflected by the test target after transmitting a signal at a second directivity angle different from the first directivity angle; calculating a power ratio of the first test signal to the second test signal; and detecting a mounting angle corresponding to the power ratio calculated using vertical reference power ratio information storing a power ratio measured according to a vertical angle of the radar apparatus.

In accordance with another aspect of the present disclosure, there is provided a radar apparatus for a vehicle including: an antenna unit configured to receive, by the radar apparatus mounted on a vehicle, a first test signal reflected by a test target after transmitting a signal at a first directivity angle, and to receive a second test signal reflected by the test target after transmitting a signal at a second directivity angle different from the first directivity angle; a storage unit configured to store vertical reference power ratio information obtained by calculating a power ratio between signals acquired in a test environment for each vertical angle between the radar apparatus and the ground; and a controller configured to calculate a power ratio of the first test signal to the second test signal and to detect a mounting angle corresponding to the power ratio calculated using the vertical reference power ratio information.

As described above, according to the present embodiment, it is possible to detect a mounting angle only by transmitting/receiving signal processing without a special mechanical configuration.

Further, the reliability of estimation of the mounting angle is further improved by making modulation characteristics of transmitted signals the same and correcting an error due to a horizontal angle of the radar apparatus.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
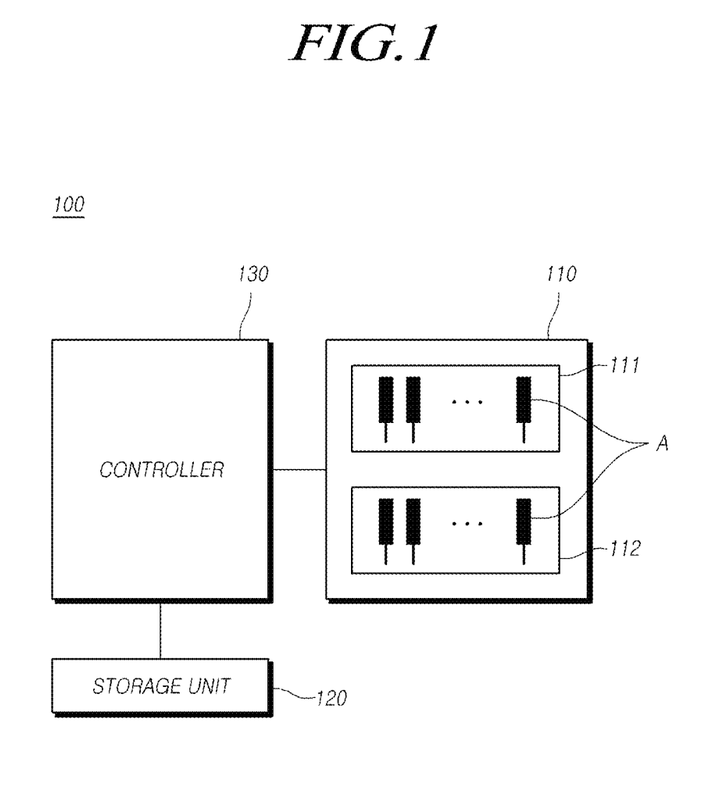
FIG. 1 is a diagram illustrating the configuration of a radar apparatus according to an embodiment.

FIG. 1 is a diagram illustrating the configuration of a radar apparatus according to an embodiment.

Figure 2:
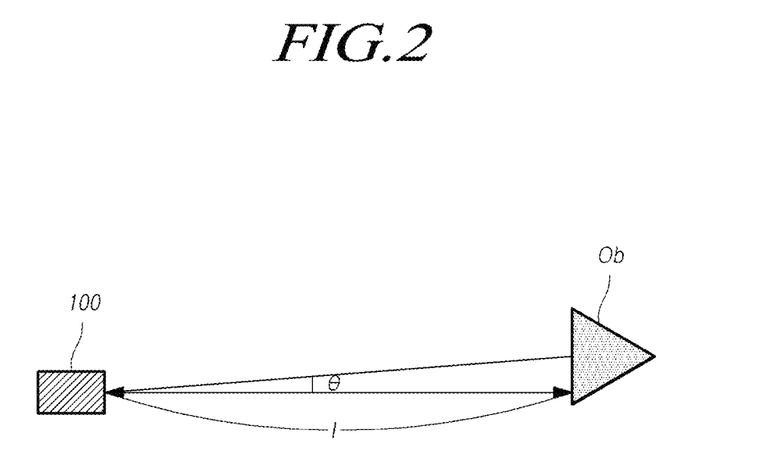
FIG. 2 is a diagram illustrating a test environment for detecting a mounting angle of a radar apparatus.

FIG. 2 is a diagram illustrating a test environment for detecting a mounting angle of a radar apparatus.

Figure 3:
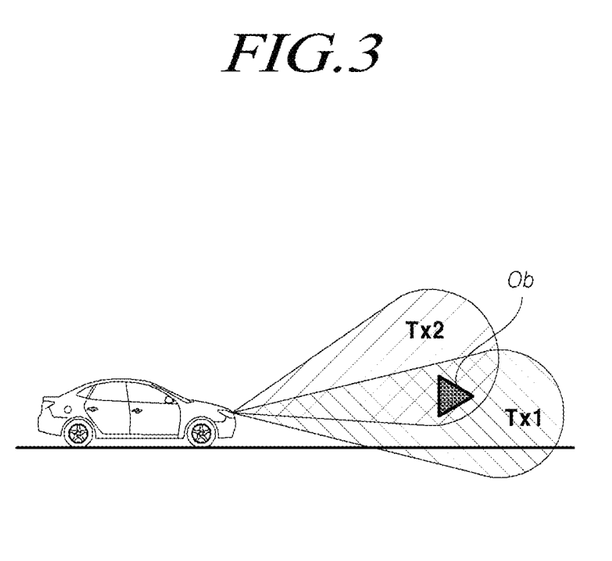
FIG. 3 is a diagram illustrating a principle of detecting a mounting angle of a radar apparatus according to an embodiment.

FIG. 3 is a diagram illustrating a principle of detecting a mounting angle of a radar apparatus according to an embodiment.

Referring to FIG. 1, a radar apparatus 100 for a vehicle according to an embodiment of the present disclosure is a frequency modulated continuous wave (FMCW) radar that detects a target by continuously transmitting a modulated signal. The radar apparatus 100 includes an antenna unit 110 configured to transmit and receive signals, a storage unit 120 configured to store information necessary for driving the apparatus, and a controller 130 configured to control each configuration.

The antenna unit 110 is constituted of a plurality of antennas. Specifically, the antenna unit 10 may be constituted of a plurality of transmission antenna units 111 for transmitting signals and a plurality of reception antenna units 112 for receiving signals reflected from objects.

At this time, the transmission antenna unit 111 and the reception antenna unit 112 may be constituted of a plurality of antennas A arranged in a one-dimensional or two-dimensional array, respectively, and each antenna A may have a different directivity angle.

In addition, the transmission antenna unit 111 may be divided into a short range antenna for sensing a short range according to a sensing region and a long range antenna for sensing a long range. The reception antenna unit 112 may receive a signal without dividing the sensing region.

The storage unit 120 may store firmware necessary for driving the apparatus and various kinds of information that is generated when the apparatus is driven. In addition, the storage unit 120 may store information such as reference power ratio information, a main beam region, a threshold value, and the like, which will be described below.

The controller 130 controls signal transmission and reception of the antenna unit 110. The controller 130 may control a signal transmitted from the transmission antenna unit 111 and may analyze a signal received at the reception antenna unit 112 to calculate a distance to an object.

In addition, the controller 130 may control a signal transmitted from the transmission antenna unit 111, or may adjust an object detection region through selection of an antenna that transmits a signal. In this transmission and reception of signals, beamforming technique can be applied.

In addition, the controller 130 may detect a vehicle mounting angle of the radar apparatus 100 for a vehicle, and may perform alignment of the radar apparatus using the detected mounting angle.

A test target Ob provided in accordance with predetermined test conditions is used for the detection of the mounting angle. The predetermined test conditions may be defined as a position of the radar apparatus 100 for a vehicle and a position of the test target Ob. The predetermined test conditions may also include test environment factors such as reflectance of the test target Ob, temperature or humidity of a test chamber, and the like.

At this time, the position of each of the radar apparatus 100 for a vehicle and the test target Ob may be defined as an absolute position or defined as a relative position using a distance 1 between the radar apparatus 100 for a vehicle and the test target Ob, an angle θ formed between the radar apparatus 100 for a vehicle and the test target Ob, and the like as variables, as shown in FIG. 2.

A signal incident on the test target Ob according to the test conditions varies depending on a transmission angle of a radar signal as shown in FIG. 3, and thereby a signal which is reflected by the test target Ob to be received by the antenna unit 110 also varies depending on the transmission angle of the signal.

Therefore, the controller 130 detects the mounting angle of the apparatus using a power ratio of a signal reflected by the test target Ob after transmitting a signal at a first directivity angle to a signal reflected by the test target Ob after transmitting a signal at a second directivity angle.

Here, the second directivity angle and the first directivity angle have the same horizontal angle and have a different vertical angle which is formed with the ground. The controller 130 may control signals transmitted from the antenna unit 110 to generate signals having different directivity angles. Further, a difference between the first directivity angle and the second directivity angle may be set as a predetermined angular difference, and the predetermined angular difference may be set to be equal to an angular difference between a first directivity angle signal and a second directivity angle signal which are transmitted to generate vertical reference power ratio information.

As an example of adjustment of the directivity angle of the signal, the controller 130 may adjust a directivity angle of a signal transmitted through selection of an antenna that transmits a signal.

For example, the controller 130 may generate a signal having a first directivity angle through a first transmission antenna provided at the first directivity angle and a signal having a second directivity angle through a second transmission antenna provided at the second directivity angle.

As another example of adjustment of the directivity angle of the signal, the controller 130 may adjust a directivity angle of a signal transmitted through beam forming of a signal transmitted through the antenna unit 110.

For example, the controller 130 performs beamforming on a signal transmitted from the transmission antenna unit 111 so as to have a first directivity angle, and performs beamforming on a signal transmitted from the transmission antenna unit 111 so as to have a second directivity angle, thereby generating signals having different directivity angles.

Hereinafter, a method for detecting an angle of a radar apparatus 100 for a vehicle according to an embodiment will be described in detail with reference to the drawings.

Figure 4:
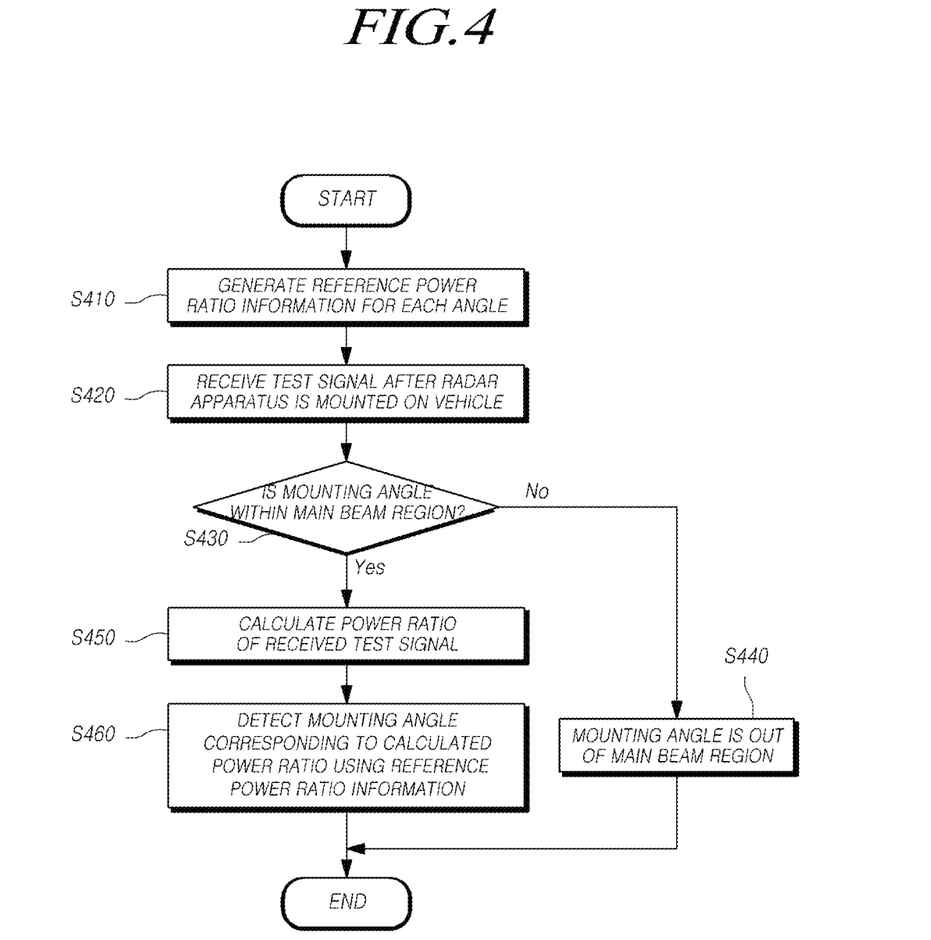
FIG. 4 is a flowchart illustrating a method for detecting an angle of a radar apparatus according to an embodiment.

FIG. 4 is a flowchart illustrating a method for detecting an angle of a radar apparatus according to an embodiment.

Referring to FIG. 4, according to the method for detecting the angle according to an embodiment, in operation S410, the radar apparatus 100 for a vehicle generates reference power ratio information.

The reference power ratio information refers to information obtained by storing the power ratio of signals reflected and received by the test target Ob to correspond to signals transmitted at different directivity angles, for each angle formed between the ground and the radar apparatus 100 for a vehicle.

Specifically, when the radar apparatus 100 for a vehicle and the test target Ob are positioned under the test conditions, the antenna unit 110 performs a process of receiving a first signal reflected by the test target Ob after transmitting a transmission signal having a first directivity angle and receiving a second signal reflected by the test target Ob after transmitting a transmission signal having a second directivity angle, for each of a vertical angle between the ground and the radar apparatus 100 according to the control of the controller 130.

At this time, the transmission of the first signal and the second signal may be temporally separated in order to reduce an error due to interference between the transmission signal having the first directivity angle and the transmission signal having the second directivity angle.

Figure 5:
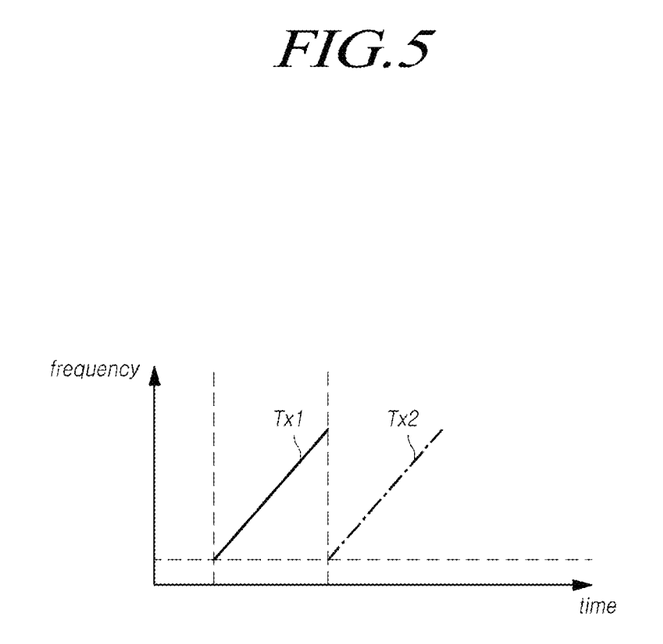
FIG. 5 is a diagram illustrating a signal transmitted by a radar apparatus according to an embodiment for detection of a mounting angle.

That is, the controller 130 may control the antenna unit 110 so that the transmission signal Tx1 having the first directivity angle and the transmission signal Tx2 having the second directivity angle are transmitted with a time difference, as shown in FIG. 5.

At this time, the antenna unit 110 may transmit the transmission signal Tx1 having the first directivity angle and the transmission signal Tx2 having the second directivity angle at the same modulation specification, and may minimize an error due to the transmitted signal. For example, a transmission frequency modulation pattern according to the time of the signal transmitted at the first directivity angle and a transmission frequency modulation pattern according to the time of the signal transmitted at the second directivity angle may be set to be the same. In addition, the signal transmitted at the first directivity angle and the signal transmitted at the second directivity angle may be transmitted at different points of time, and may be continuously transmitted as needed.

Figure 6:
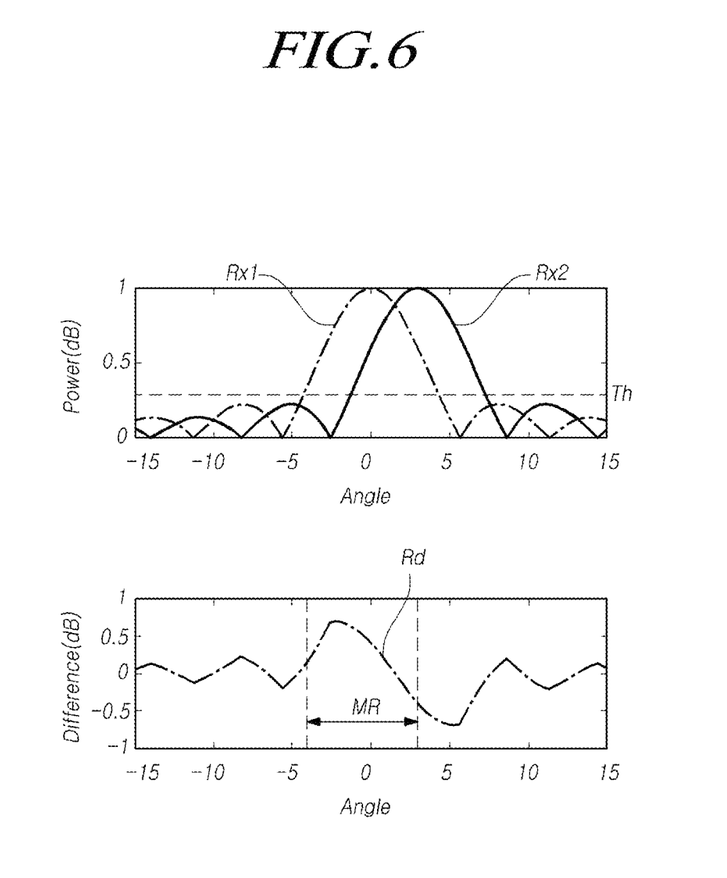
FIG. 6 is a diagram illustrating reference power ratio information used for detecting a mounting angle of a radar apparatus according to an embodiment.

When the first signal and the second signal are received through the above process, the controller 130 may calculate a power ratio of the first signal Rx1 to the second signal Rx2 for each angle formed between the radar apparatus 100 for a vehicle and the ground as shown in FIG. 6, and thereby may generate reference power ratio information Rd.

An operation of generating the reference power ratio information described above may be performed in a test chamber provided with the above-described test conditions before the radar apparatus 100 for a vehicle is mounted on a vehicle (e.g., when the manufacture of the radar apparatus 100 for a vehicle is completed).

In addition, the reference power ratio information may be stored in the storage unit 120 in the form of a look-up table.

When the generation of the reference power ratio information is completed, a main beam region where the mounting angle of the radar apparatus 100 is measurable may be set.

Since the reference power ratio information Rx according to angles has a plurality of inflection points as shown in FIG. 6, the controller 130 sets the main beam region MR in an angular range in which there is no overlapping power ratio based on a reference angle at which the ground and the radar apparatus 100 for a vehicle are parallel to each other.

In addition, the controller 130 may set a threshold value Th for the size of a received signal in order to detect the main beam region MR.

As an example of setting of the threshold value, the controller 130 may select a received signal having large size at the reference angle, may extract a minimum value of the size of the selected signal within the main beam region, and may set the extracted minimum value as a threshold value Th. For example, a first signal having a maximum value at the reference angle may be selected as a threshold value setting signal, and a minimum value of the size of the first signal in a range corresponding to the main beam region may be set as a threshold value Th.

At this time, the minimum value set as the threshold value Th may be corrected according to the pattern of the selected signal. Specifically, as shown in FIG. 6, the size of the signal received through the test target Ob has a plurality of peaks, so that the controller 130 may search for a second-order peak in the selected signal, and may correct the threshold value Th to a value larger than the searched peak.

As another example of setting of the threshold value Th, the controller 130 may extract a minimum value of the first signal size and a minimum value of the second signal size within the main beam range, respectively, and may set all the extracted minimum values as the threshold value Th.

Referring again to FIG. 2, in operation 420, the radar apparatus 100 for a vehicle receives a test signal under a test condition after the radar apparatus 100 is mounted on a vehicle. At this time, the test condition is the same as the test condition used for generating the reference power ratio information described above, and the test signal includes a first test signal received corresponding to transmission of a signal having the first directivity angle and a second test signal received corresponding to transmission of a signal having the second directivity angle.

Specifically, when the radar apparatus 100 for a vehicle is placed under the same condition as a reference test condition after being mounted on the vehicle, the antenna unit 110 receives a first test signal reflected by the test target Ob after transmitting a transmission signal having a first directivity angle and a second test signal reflected by the test target Ob after transmitting a transmission signal having a second directivity angle, according to the control of the controller 130.

At this time, the transmission signal transmitted through the antenna unit 110 has the same modulation characteristics as a signal transmitted at the time of generating the reference power ratio information.

When the reception of the test signal is completed, the radar apparatus 100 for a vehicle determines whether the mounting angle is within the main beam region in operation S430. The above-described threshold value can be used for the determination of the main beam region.

Specifically, when, based on a comparison between the size of the test signal whose threshold value is set and a threshold value, the size of the received test signal is larger than the threshold value, the controller 130 may determine that the mounting angle is within the main beam region. When the size of the received test signal is equal to or smaller than the threshold value, the controller 130 may determine that the mounting angle is out of the main beam region.

For example, when a threshold value is set for the first signal, the controller 130 may compare the size of the first test signal with the threshold value to determine whether the mounting angle is within the main beam region. When a threshold value is set for each of the first signal and the second signal, the controller 130 may compare the size of each of the first test signal and the second test signal with the threshold value to determine whether the mounting angle is within the main beam region. Alternatively, when a threshold value is set for the second signal, the controller 130 may compare the size of the first test signal with the threshold value to determine whether the mounting angle is within the main beam region. Accordingly, the threshold value may be set for each test signal, and may be set as the same value or a different value for each test signal. Also, the determination as to whether the mounting angle is within the main beam region may be performed by comparing at least one signal of the first test signal and the second test signal with a threshold value associated with the at least one signal.

When it is determined that the mounting angle is out of the main beam region in operation S430, the controller 130 completes the corresponding operation while leaving a record indicating that the mounting angle is out of the main beam region in operation S440.

Meanwhile, when it is determined that the mounting angle is within the main beam region, the radar apparatus 100 for a vehicle calculates a power ratio of the received signal in operation S450, and detects a mounting angle corresponding to the calculated power ratio information using reference power ratio information in operation S460.

Specifically, the radar apparatus 100 for a vehicle may calculate a power ratio of the first test signal to the second test signal, and may detect an angle corresponding to the power ratio information calculated from the reference power ratio information as the mounting angle of the radar apparatus 100 for a vehicle.

In FIG. 4, the method for detecting the mounting angle with respect to the vertical direction has been described. However, in the mounting environment of the actual radar apparatus 100 for a vehicle, a power ratio error of the test signal may occur in accordance with an angle change in the horizontal direction. Hereinafter, a method for detecting a mounting angle to which error correction according to a horizontal mounting angle of the radar apparatus is applied will be described.

Figure 7:
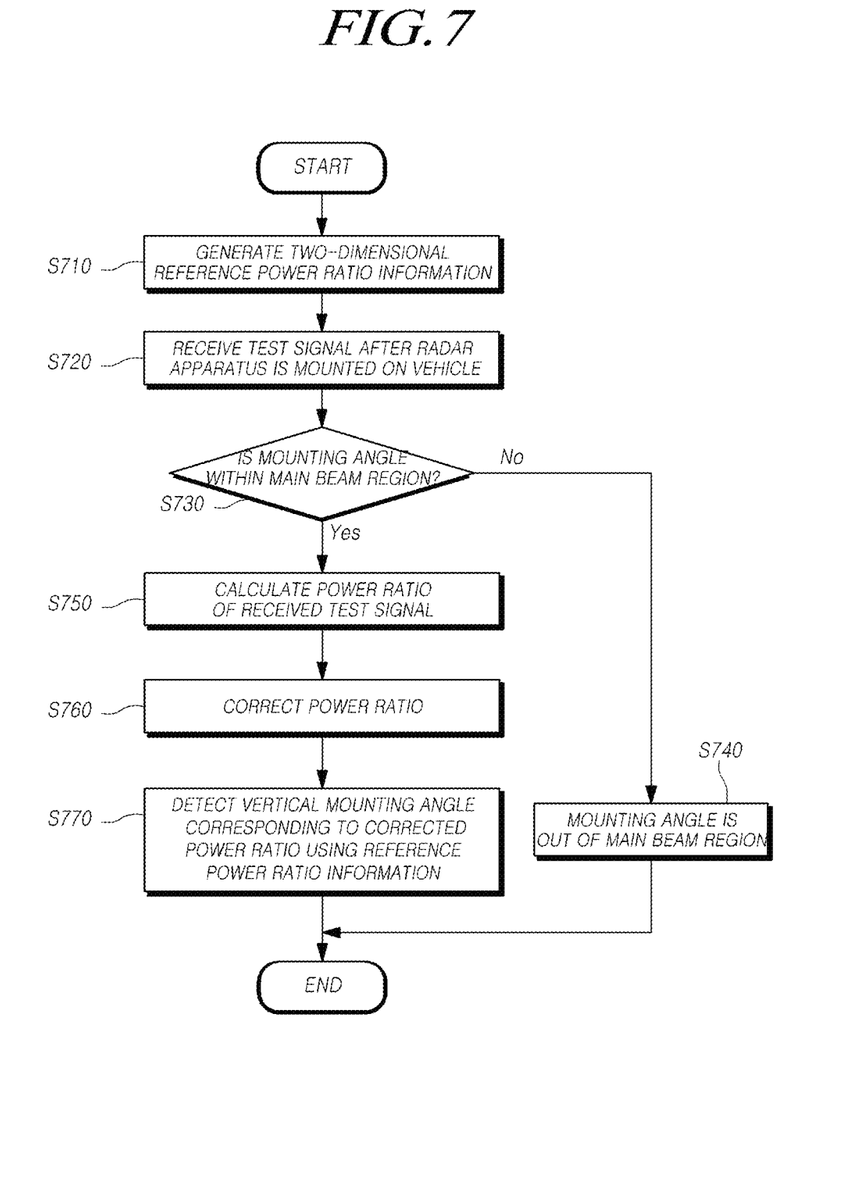
FIG. 7 is a flowchart illustrating a method for detecting an angle according to another embodiment.

FIG. 7 is a flowchart illustrating a method for detecting an angle according to another embodiment.

Figure 8:
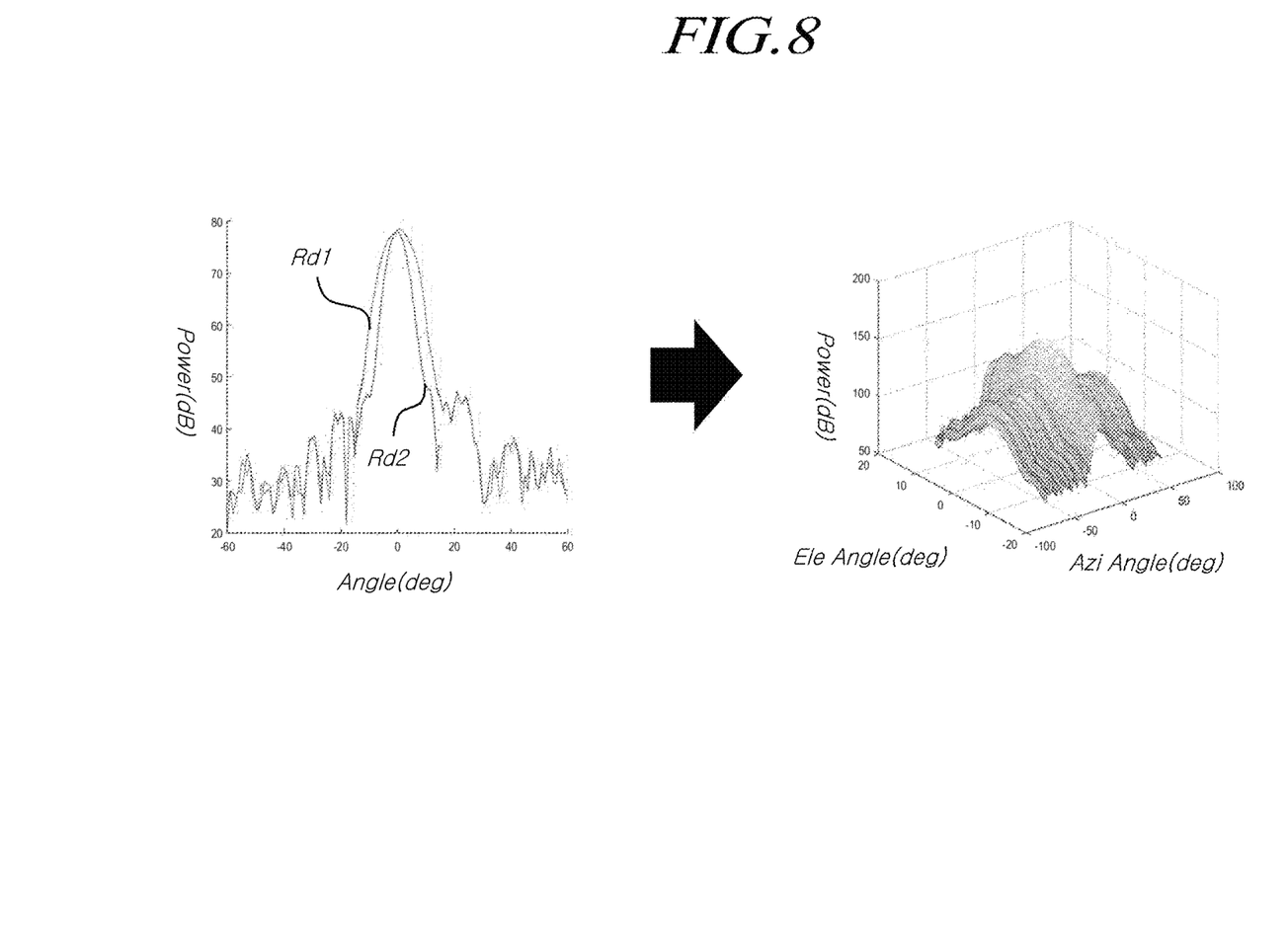
FIG. 8 is a diagram illustrating a concept of a two-dimensional reference power ratio.

FIG. 8 is a diagram illustrating a concept of a two-dimensional reference power ratio.

Referring to FIG. 7, the method for detecting an angle according to another embodiment generates two-dimensional reference power ratio information under a predetermined test condition in operation S710.

The two-dimensional reference power ratio information refers to information obtained by calculating and storing a power ratio between signals obtained by transmitting signals at different directivity angles in a test environment for each a vertical/horizontal angle between the radar apparatus and the ground.

In the method for detecting the angle according to another embodiment, two-dimensional reference power ratio information may be estimated and generated according to the following Equation 1.

$$BP_{2D\ Est}(\theta,\varphi)=BP_{Azi}(\theta) \times BP_{Ele}(\varphi)$$ [Equation 1]

Here, $BP_{2D\ Est}\ BP_{Est}$ denotes estimated two-dimensional reference information, $BP_{Azi}$ denotes reference power ratio information for a horizontal angle, and $BP_{Ele}$ denotes reference power ratio information for a vertical angle.

That is, the two-dimensional reference power ratio information may be estimated as a product of vertical reference power ratio information Rd1 generated for each vertical angle and horizontal reference power ratio information Rd2 generated for each horizontal angle as shown in FIG. 8.

Therefore, the method for detecting the angle according to another embodiment may generate horizontal reference power ratio information using a power ratio acquired while fixing the horizontal angle of the radar apparatus and changing the vertical angle thereof as described above, and may generate vertical reference power ratio information using a power ratio acquired while fixing the vertical angle and changing the horizontal angle, thereby generating the two-dimensional reference power ratio information.

By estimating the two-dimensional reference power ratio information in this way, it is possible to reduce the time and cost required for generating the reference power ratio information.

The radar apparatus 100 for a vehicle receives a test signal under a test condition after being mounted on a vehicle in operation S720, and determines whether the mounting angle of the radar apparatus is within the main beam region in operation S730.

When the mounting angle of the radar apparatus is within the main beam region (YES of operation S730), the radar apparatus 100 for a vehicle calculates a power ratio between the received signals in operation S750, and corrects an error due to a vertical mounting angle in the calculated power ratio in operation S760.

The power ratio calculated under the test condition can be expressed by a product of a horizontal power ratio and a vertical power ratio as shown in the following Equation 2.

$$\text{Ratio} = \frac{Tx1\ Pow_{Azi}}{Tx2\ Pow_{Azi}} \times \frac{Tx1\ Pow_{Ele}}{Tx2\ Pow_{Ele}}$$ [Equation 2]

Here, Ratio denotes the calculated power ratio, $$\frac{Tx1\ Pow_{Azi}}{Tx2\ Pow_{Azi}}$$

denotes the horizontal power ratio, and $$\frac{Tx1\ Pow_{Ele}}{Tx2\ Pow_{Ele}}$$

denotes the vertical power ratio.

Therefore, the controller 130 may obtain the horizontal angle, and may calculate an error corresponding to the horizontal angle obtained by using the horizontal reference power ratio information to correct the obtained power ratio.

Specifically, the controller 130 detects the horizontal angle. Since the signal reflected by the test target Ob is different for each of the reception antennas due to a path difference between the reception antenna and the test target Ob, the controller 130 calculates the horizontal angle using a phase difference between the signals received from the antennas provided horizontally to each other.

A method for detecting the horizontal angle using the phase difference generated by the path difference of the signal corresponds to the prior art, and a detailed description thereof will be omitted.

When the horizontal angle is calculated, the controller 130 calculates the power ratio corresponding to the horizontal angle as an error, using the horizontal reference power ratio information, and corrects the power ratio using the calculated error. That is, the controller 130 may correct a test power ratio by dividing the horizontal power ratio by the test power ratio.

The controller 130 detects the mounting angle corresponding to the corrected power ratio using the vertical reference power ratio information in operation S770.

As described above, according to the present disclosure, the mounting angle of the radar apparatus for a vehicle may be measured without adding any special mechanical or electronic configuration.

In addition, by generating the reference power ratio for the horizontal direction and the reference power ratio for the vertical direction, respectively, and estimating the two-dimensional power ratio information, it is possible to reduce the time and cost required for generating the reference power ratio and to further increase the measurement accuracy of the vertical angle by correcting an error due to the vertical direction.

According to the present embodiment as described above, it is possible to improve target object detection performance by analyzing a received signal acquired by a target object detection device to efficiently remove an interference signal. In addition, according to the present embodiment, it is possible to improve target object detection performance even in an environment in which various interference signals exist by classifying the types of interference signals and adjusting target detection parameters according to the classified types of the interference signals.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

The above embodiments of the present disclosure have been described only for illustrative purposes, and those skilled in the art will appreciate that various modifications and changes may be made thereto without departing from the scope and spirit of the disclosure. The scope of the present disclosure shall be construed on the basis of the accompanying claims in such a manner that all of the technical ideas included within the scope equivalent to the claims belong to the present disclosure.

What is claimed is:

1. A method for estimating an angle of a radar apparatus for a vehicle, the method comprising:
    receiving, by the radar apparatus mounted on a vehicle, a first test signal reflected by a test target in response to transmission of a signal at a first directivity angle;
    receiving a second test signal reflected by the test target in response to transmission of a signal at a second directivity angle different from the first directivity angle;
    calculating a power ratio of the first test signal to the second test signal;
    extracting a mounting angle of the radar apparatus, which is an angle that the radar apparatus is mounted relative to the vehicle, corresponding to the calculated power ratio of the first test signal to the second test signal from a plurality of reference power ratios stored in storage, wherein each of the plurality of reference power ratios is stored to correspond to a respective mounting angle of the radar apparatus, which is the angle that the radar apparatus is mounted relative to the vehicle; and
    adjusting one or more parameters for target detection based on the extracted mounting angle of the radar apparatus, which is the angle that the radar apparatus is mounted relative to the vehicle.

2. The method of claim 1, further comprising:
    receiving the signal reflected by the test target after transmitting the signal at the first directivity angle and the second directivity angle for each mounting angle of the radar apparatus before the radar apparatus is mounted on the vehicle, and calculating a power ratio of the received signal for the each mounting angle to generate the each of the plurality of reference power ratios.

3. The method of claim 2, wherein the test target used for generating the reference power ratios is provided according to the same test condition as the test target used for receiving the test signal.

4. The method of claim 1, wherein the receiving of the second test signal comprises transmitting the signal at the second directivity angle to have the same modulation characteristics as those of the signal at the first directivity angle.

5. The method of claim 4, wherein a transmission frequency modulation pattern according to time of the signal transmitted at the first directivity angle and a transmission frequency modulation pattern according to time of the signal transmitted at the second directivity angle are the same.

6. The method of claim 1, wherein
    a difference between the first directivity angle and the second directivity angle is set as a predetermined angular difference, and
    the predetermined angular difference is equal to an angular difference between a first directivity angle signal and a second directivity angle signal transmitted to generate at least one of the plurality of the reference power ratios.

7. The method of claim 1, wherein the adjusting of the one or more parameters for the target detection based on the mounting angle of the radar apparatus comprises
    correcting an error due to the mounting angle of the radio apparatus at the power ratio of the first test signal to the second test signal.

8. The method of claim 7, wherein the correcting of the error comprises
    calculating a horizontal mounting angle using a phase difference generated due to a path difference between the test target and a reception antenna,
    calculating a vertical mounting angle using the phase difference generated due to the path difference between the test target and the reception antenna, and
    calculating an error corresponding to the horizontal and vertical mounting angles of the radar apparatus using a plurality of horizontal and vertical reference power ratios stored in the storage, wherein each of the plurality of horizontal and vertical reference power ratios is stored to correspond to a respective horizontal and vertical mounting angle of the radar apparatus.

9. The method of claim 1, further comprising:
    determining whether the mounting angle of the radar apparatus is out of a predetermined main beam region when the size of the first test signal or the second test signal is smaller than the predetermined threshold value.

10. The method of claim 9, further comprising:
    setting the main beam region in an angular range where there is no overlapping power ratio based on a reference angle at which the radar apparatus is parallel to the ground from the plurality of reference power ratios; and
    setting, as the threshold value, a minimum value of the signal reflected by the test target after transmitting the signal at the first directivity angle and the second directivity angle in the angular range corresponding to the main beam region.

11. The method of claim 1, wherein:
    horizontal angles of the first directivity angle and the second directivity angle are the same as each other, and
    vertical angles of the first directivity angle and the second directivity angle are different from each other.

12. A radar apparatus for a vehicle comprising:
    an antenna unit configured to receive, by the radar apparatus mounted on a vehicle, a first test signal reflected by a test target in response to transmission of a signal at a first directivity angle, and to receive a second test signal reflected by the test target in response to transmission of a signal at a second directivity angle different from the first directivity angle;

a storage unit configured to store a plurality of reference power ratios obtained by calculating a power ratio between signals acquired for each angle between the radar apparatus and a ground, wherein each of the plurality of reference power ratios is stored to correspond to a respective mounting angle of the radar apparatus, which is an angle that the radar apparatus is mounted relative to the vehicle; and a controller configured to:

calculate a power ratio of the first test signal to the second test signal, extract a mounting angle of the radar apparatus, which is the angle that the radar apparatus is mounted relative to the vehicle, corresponding to the calculated power ratio of the first test signal to the second test signal from the plurality of reference power ratios stored in the storage unit, and adjust one or more parameters for target detection based on the extracted mounting angle of the radar apparatus, which is the angle that the radar apparatus is mounted relative to the vehicle.

13. The radar apparatus of claim 12, wherein the controller controls the antenna unit to receive the signal reflected by the test target in response to transmission of the signal at the first directivity angle and the second directivity angle for each vertical angle of the radar apparatus before the radar apparatus is mounted on the vehicle, and calculates a power ratio of the signal received through the antenna unit for the each vertical angle to generate the each of the plurality of reference power ratios.

14. The radar apparatus of claim 13, wherein the test target used for generating the reference power ratios is provided according to the same test condition as the test target used for receiving the test signal.

15. The radar apparatus of claim 12, wherein the signal at the first directivity angle and the signal at the second directivity angle have the same modulation characteristics, and a transmission frequency modulation pattern according to time of the signal transmitted at the first directivity angle and a transmission frequency modulation pattern according to time of the signal transmitted at the second directivity angle are the same.

16. The radar apparatus of claim 12, wherein the controller is configured to correct an error due to the mounting angle of the radar apparatus from the power ratio of the first test signal to the second test signal.

17. The radar apparatus of claim 16, wherein the controller is configured to:

calculate a horizontal mounting angle using a phase difference generated due to a path difference of the test target and a reception antenna, calculate a vertical mounting angle using the phase difference generated due to the path difference between the test target and the reception antenna, and correct an error corresponding to the horizontal and vertical mounting angles of the radar apparatus using a plurality of horizontal and vertical reference power ratios acquired by calculating the power ratio between the signals acquired for each horizontal and vertical mounting angle between the radar apparatus and the ground, wherein the plurality of horizontal and vertical reference power ratios are stored in the storage unit and each of the plurality of horizontal and vertical reference power ratios is stored to correspond to a respective horizontal and vertical mounting angle of the radar apparatus.

18. The radar apparatus of claim 12, wherein the controller determines whether the mounting angle is within a main beam region based on the size of the test signal, and determines that the mounting angle is out of the main beam region when the test signal is smaller than a predetermined threshold value.

19. The radar apparatus of claim 18, wherein the main beam region is set in an angular range where there is no overlapping power ratio based on a reference angle at which the radar apparatus is parallel to the ground from the plurality of reference power ratios, and the threshold value is set as a minimum value of the signal acquired in the angular range corresponding to the main beam region.

20. The radar apparatus of claim 12, wherein:

horizontal angles of the first directivity angle and the second directivity angle are the same as each other, and vertical angles of the first directivity angle and the second directivity angle are different from each other.

* * * * *